United States Patent
Reina et al.

(10) Patent No.: US 12,131,171 B2
(45) Date of Patent: Oct. 29, 2024

(54) SYSTEMS AND METHODS FOR PRESENTING MULTIPLE VIEWS OF DATA

(71) Applicant: 4i Analytics, Inc., Indianapolis, IN (US)

(72) Inventors: Gabriel E. Reina, Tucson, AZ (US); Thomas R. Hershberger, Indianapolis, IN (US)

(73) Assignee: Degrees of Interest, Inc., Arlington, VA (US)

( * ) Notice: Subject to any disclaimer, the term of this patent is extended or adjusted under 35 U.S.C. 154(b) by 0 days.

(21) Appl. No.: 18/444,295

(22) Filed: Feb. 16, 2024

(65) Prior Publication Data

US 2024/0303099 A1    Sep. 12, 2024

Related U.S. Application Data

(60) Provisional application No. 63/451,108, filed on Mar. 9, 2023.

(51) Int. Cl.
*G06F 9/451*    (2018.01)
*G06F 3/0481*    (2022.01)
*G06F 3/04847*    (2022.01)

(52) U.S. Cl.
CPC ............ *G06F 9/453* (2018.02); *G06F 3/0481* (2013.01); *G06F 3/04847* (2013.01)

(58) Field of Classification Search
CPC .... G06F 9/453; G06F 9/0481; G06F 9/04847; G06F 3/0481; G06F 3/04847
See application file for complete search history.

(56) References Cited

U.S. PATENT DOCUMENTS

| | | | | |
|---|---|---|---|---|
| 11,698,721 B2* | 7/2023 | Wong | | G06F 3/0488 715/800 |
| 11,853,543 B2* | 12/2023 | Zhang | | G06F 3/04815 |
| 2003/0069888 A1* | 4/2003 | Pasquali | | G06F 16/957 |
| 2006/0085760 A1* | 4/2006 | Anderson | | G06F 3/0481 715/838 |
| 2006/0248471 A1* | 11/2006 | Lindsay | | G09G 5/14 715/800 |
| 2007/0083821 A1* | 4/2007 | Garbow | | G06F 3/0481 715/781 |
| 2008/0115081 A1* | 5/2008 | Sankaravadivelu | .. | G06F 3/0481 715/783 |

(Continued)

OTHER PUBLICATIONS

International Search Report and Written Opinion for International patent application No. PCT/US2024/016250, filed Feb. 16, 2024, mailed Jul. 2, 2024.

*Primary Examiner* — Tadesse Hailu
(74) *Attorney, Agent, or Firm* — Faegre Drinker Biddle & Reath LLP

(57) ABSTRACT

Systems are disclosed including, for example, one or more processors configured to execute the instructions and perform operations including receiving data from one or more data sources; generating, by one or more processors, a plurality of tiers of views for the received data, the plurality of tiers of views including a minimized view, an active view, and a small view; and rendering, by the one or more processors, a representation of the received data, the representation including an active view of a first set of data in the received data and a small view of a second set of data in the received data.

27 Claims, 10 Drawing Sheets

(56) References Cited

U.S. PATENT DOCUMENTS

| | | | |
|---|---|---|---|
| 2010/0088634 A1* | 4/2010 | Tsuruta | G06F 3/0481 |
| | | | 715/788 |
| 2012/0096397 A1* | 4/2012 | Ording | G06F 3/04817 |
| | | | 715/802 |
| 2015/0120786 A1 | 4/2015 | Slovacek | |
| 2018/0129372 A1 | 5/2018 | Ellis | |
| 2020/0363939 A1* | 11/2020 | Fitzgerald | G06F 3/04845 |
| 2020/0379631 A1 | 12/2020 | Karlsson | |
| 2021/0034225 A1* | 2/2021 | Harazi | G06F 3/04845 |
| 2021/0133240 A1 | 5/2021 | Talbot | |
| 2021/0200790 A1* | 7/2021 | Cheng | G06F 16/248 |
| 2022/0197675 A1* | 6/2022 | Adler | G06F 3/0481 |

\* cited by examiner

SYSTEMS AND METHODS FOR PRESENTING MULTIPLE VIEWS OF DATA

CROSS REFERENCE TO RELATED APPLICATIONS

This application claims priority to U.S. Provisional Application No. 63/451,108, filed Mar. 9, 2023, incorporated by reference herein for all purposes.

FIELD

The present disclosure relates to systems and methods for presenting data. More specifically, some embodiments of the present disclosure relate to systems and methods for presenting multiple views (e.g., multiple graphical representations) of data.

BACKGROUND

Large amount of data is collected, processed, organized, and presented. For example, law enforcement agencies collect and deal with large amounts of data during investigations. Numerous reports and/or graphics representing summarizing data are generated, reviewed, and analyzed every day. Reports can include text and/or data streams. For an investigation, as an example, certain graphical representations or summaries may be generated to process and analyze the reports. A need therefore exists to improve ways to generate and/or present graphical representations of data and/or summaries.

BRIEF DESCRIPTION OF THE DRAWINGS

The accompanying drawings are incorporated in and constitute a part of this specification and, together with the description, explain the features and principles of the present disclosure. In the drawings.

Figure 1:
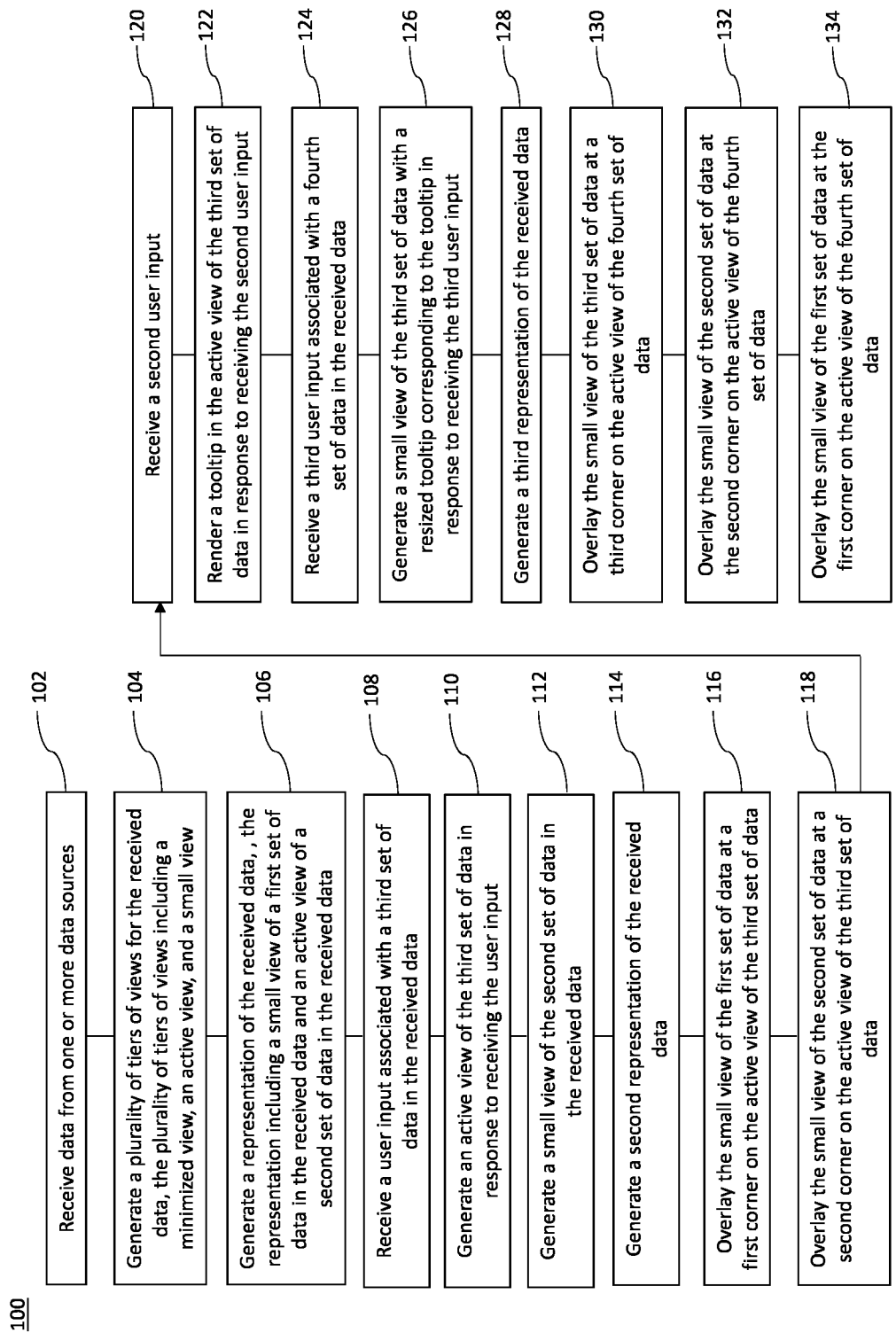
FIG. 1 depicts an illustrative flow diagram showing a method for presenting multiple views of data, in accordance with certain embodiments of the present disclosure.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

SUMMARY

The present disclosure relates to systems and methods for presenting data. More specifically, some embodiments of the present disclosure relate to systems and methods for presenting multiple views (e.g., multiple graphical representations) of data.

Large amount of data is collected, processed, organized, and presented. For example, many law enforcement agencies are analyzing large amounts of data. In some examples, when investigations come together a copious amount of data is collected. In certain embodiments, there is a need for better and more efficient ways to generate and/or present graphical representations and/or summaries of data (e.g., data reports). At least some systems and methods of the present disclosure are directed to generating and/or presenting data (e.g., data points, datasets) and multiple views (e.g., graphical representations, minimized views, active views, small views) of graphics or summaries of data. In certain embodiments, the systems and methods of the present disclosure can improve efficiency regarding the presentation of data, for example, from one or more data sources, one or more investigations, and improve efficiency of analyzing the data. In some embodiments, the systems and methods of the present disclosure relate to provide tiered views of data, for example, improve the presentation of related data (e.g., data from investigations related to one or more related topics and/or issues).

In some embodiments, a method for presenting data includes receiving data from one or more data sources; generating, by one or more processors, a plurality of tiers of views for the received data, the plurality of tiers of views including a minimized view, an active view, and a small view, the small view being smaller than the active view in size and larger than the minimized view in size, the small view including a view control to minimize the small view; and rendering, by the one or more processors, a representation of the received data, the representation including an active view of a first set of data in the received data and a small view of a second set of data in the received data.

In some embodiments, the method further includes receiving a user input; in response to receiving the user input, generating an active view of a third set of data in the received data; generating a small view of the first set of data in the received data; rendering the active view of the third set of data; overlaying the small view of the second set of data at a first corner on the active view of the third set of data; and overlaying the small view of the first set of data at a second corner on the active view of the third set of data. The first corner may be different from the second corner.

In yet some embodiments, the method further includes receiving a second user input; in response to receiving the second user input, rendering a tooltip in the active view of the third set of data. The method may further include receiving a third user input; in response to receiving the third user input, generating a small view of the third set of data with a resized tooltip corresponding to the tooltip; rendering an active view of the fourth set of data in the received data; overlaying the small view of the second set of data at the first corner on the active view of the fourth set of data; overlaying the small view of the first set of data at the second corner on the active view of the fourth set of data; and overlaying the small view of the third set of data at a third corner on the active view of the fourth set of data. The first corner, the second corner, and the third corner may be in a predetermined sequence.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

Numerous reports including text or data streams are generated, reviewed, and analyzed every day. For example, for an incident, there are possibly a large number of related investigation reports to review and analyze, leading to an even larger number of data extracted from these reports. As used herein, in some embodiments, a report refers to a data stream retrieved or received from a data source, which can be a text data stream, a codified data stream, a numerical data stream, an alphanumerical data stream, a data record, a file, and/or the like. In certain embodiments, a need exists to better present data obtained from these reports for better visual representation and thus more efficient analysis process, especially in the context of investigations that are time-sensitive.

At least some systems and methods of the present disclosure are directed to presenting data (e.g., data points, datasets) and multiple views (e.g., minimized view, active view, small view) of graphics or summaries of data. In certain embodiments, the systems and methods can improve efficiency regarding the presentation of data, from example, from one or more investigations, and in turn improve efficiency of analyzing the data.

According to some embodiments of the present disclosure, a method for presenting data includes receiving data from one or more data sources; generating, by one or more processors, a plurality of tiers of views for the received data, the plurality of tiers of views including a minimized view, an active view, and a small view, the small view being smaller than the active view in size and larger than the minimized view in size, the small view including a view control to minimize the small view; and rendering, by the one or more processors, a representation of the received data, the representation including an active view of a first set of data in the received data and a small view of a second set of data in the received data.

FIG. 1 depicts an illustrative flow diagram showing a method 100 for presenting multiple views of data, in accordance with certain embodiments of the present disclosure. This diagram is merely an example. One of ordinary skill in the art would recognize many variations, alternatives, and modifications. The method 100 for presenting multiple views of data includes processes 102, 104, 106, 108, 110, 112, 114, 116, 118, 120, 122, 124, 126, 128, 130, 132, and 134. Although the above has been shown using a selected group of processes for the method 100 for presenting multiple views of data, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 100 are performed by a system (e.g., the data presentation environment 900 including a data presentation system 910). In certain examples, some or all processes (e.g., steps) of the method 100 are performed by a computer and/or a processor directed by a code. For example, a computer includes a server computer and/or a client computer (e.g., a personal computer). In some examples, some or all processes (e.g., steps) of the method 100 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at process 102, the system receives data from one or more data sources. A data source may be a text data stream, a codified data stream, a numerical data stream, an alphanumerical data stream, a data record, a file, and/or the like. The one or more data sources may include one or more sets of data from each data source. The first set of data may include a first text stream.

According to certain embodiments, the one or more sets of data may be associated with an investigation. In some embodiments, the investigation may be related to law enforcement (e.g., drug transfers, money laundering, wire fraud, identity theft, etc.), although other types of investigation (e.g., employment issues) or other non-investigation are also contemplated. In some embodiments, the one or more sets of data may be associated with organization reports (e.g., reports, industry reports, business analysis, summaries, dashboards, graphs, and charts related to a company and/or its performance). In some embodiments, the one or more sets of data may be associated with comparisons (e.g., comparisons of products, comparisons of products and behaviors, industry trends, consumer/customer behaviors, and market opportunities).

In certain embodiments, the one or more sets of data may be retrieved from one or more data sources including tables of information stored in any suitable manner, storage locations of data, or storage locations within the present system (e.g., a repository or memories). Any type of accessible storage architecture is contemplated by the present disclosure. Examples of systems and data sources are further discussed below with regard to FIG. 9.

According to some embodiments, at process 104, the system generates, by one or more processors, a plurality of tiers of views for the received data, the plurality of tiers of views including a minimized view, an active view, and a small view. In some instances, a first tier may be an active view, a second tier may be a small view, and a third tier may be a minimized view.

In some embodiments, the small view is smaller than the active view in size and larger than the minimized view in size. In certain embodiments, the small view includes a view control to minimize the small view. In some instances, the size of the small view in the plurality of tiers of views is in the range of one sixteenth of the size of the active view and one eighth of the size of the active view. In certain embodiments, the size of the small view is selected to allow a high-level view of content, for example, greater than one-sixteenth of the active view (e.g., a maximized view). In some embodiments, the size of the small view is selected not to block content of the active view. In certain embodiments, the active view is designed with content (e.g., graphics, charts, explanations, tooltips, etc.) disposed in the middle of the active view. In some embodiments, the active view includes at least partially blank content at least one of the four corners of a rectangular view. In certain embodiments, each tier of views of the plurality of tiers of views (e.g., an active view, a small view, a minimized view, etc.) includes a minimized view control to cause the generation of a corresponding minimized view. In some embodiments, a minimized view includes one or more view controls. In certain embodiments, the minimized view does not include content. In some embodiments, the system provides a tooltip when an input (e.g., touch input, mouse input) is at the minimized view.

According to certain embodiments, a tooltip provides information related to an input (e.g., touch input, mouse input, touch position, mouse position, etc.). In some examples, the tooltip includes a title (e.g., the title of a view) and/or a description (e.g., the description of a view or some data). In certain examples, the tooltip includes an enlarged view of certain content. In certain embodiments, the small view and/or the minimized view include a view control to cause the generation of a corresponding active view. In some embodiments, the active view includes a visual representation (e.g., text, explanation, graphical representations, charts, etc.) of data. In certain embodiments, the active view includes a maximized view. In some embodiments, the active view includes a large view.

According to some embodiments, at process 106, the system generates, by the one or more processors, a representation of the received data, the representation including a small view of a first set of data in the received data and an active view of a second set of data in the received data. In some embodiments, the first set of data is correlated to the second set of data. In certain embodiments, the second set of data is a subset of the first set of data.

According to some embodiments, at process 108, the method 100 includes receiving a user input and/or a software input. The user input may be inputs from a software or system (e.g., inputs via a software interface). In some embodiments, a software interface includes an application programming interface (API), a web service interface, retrieving information from a file, retrieving information from a data repository, and/or the like. In certain embodiments, the user input includes a click or a double-click. According to some embodiments, at process 110, the method 100 includes generating an active view of the third set of data in the received data in response to receiving the user input. In certain examples, the user input indicates a selection of a subset of data in the active view.

According to some embodiments, at process 112, the system generates a small view of the second set of data in the received data. In some embodiments, the small view of the second set of data includes at least a part of content in the active view of the first set of data, wherein the minimized view of the plurality of tiers of views does not include content. In some embodiments, a minimized view of the first set of data does not include content. In certain embodiments, the small view of the second set of data includes content in the active view of the first set of data in a first resolution lower than a second resolution of the active view of the first set of data.

According to some embodiments, at process 114, the system generates a second representation of the received data including the active view of the third set of data. In some embodiments, at process 116, the system overlays the small view of the first set of data at a first corner on the active view of the third set of data such that the second representation of the received data includes the small view of the first set of data overlaying the active view of the third set of data. In certain embodiments, at process 118, the system overlays the small view of the second set of data at a second corner on the active view of the third set of data such that the second representation of the received data includes the small view of the second set of data overlaying the active view of the third set of data.

According to some alternative embodiments, not shown in FIG. 1, the system generates a second representation of the received data by moving the small view of the first set of data from a first corner of the active view on the first set of data to a second corner on the active view of the third set of data, and disposing the small view of the second set of data at the first corner on the active view of the third set of data. In some embodiments, the first corner is different from the second corner.

According to some embodiments, the method 100 includes receiving a second user input at process 120. In response to receiving the second user input, at process 122, the system renders a tooltip in the active view of the third set of data.

According to some embodiments, the method 100 includes receiving a third user input associated with a fourth set of data in the received data at process 124. In response to receiving the third user input, the system generates a small view of the third set of data with a resized tooltip corresponding to the tooltip at process 126, and generates a third representation of the received data including an active view of the fourth set of data in the received data at process 128. In some embodiments, at process 130, the system overlays the small view of the third set of data at a third corner on the active view of the fourth set of data such that the third representation of the received data further include the small view of the third set of data overlaying the active view of the fourth set of data. In some embodiments, the system overlays the small view of the second set of data at the second corner on the active view of the fourth set of data at process 132, and overlays the small view of the first set of data at the first corner on the active view of the fourth set of data at process 134.

According to some alternative embodiments, not shown in FIG. 1, the system generates a third representation of the received data by moving the small view of the first set of data from a second corner on the active view of the third set of data to a third corner on the active view of the fourth set of data, moving the small view of the second set of data from a first corner on the active view of the third set of data to the second corner on the active view on the fourth set of data, and disposing the small view of the third set of data at the first corner on the active view of the fourth set of data.

According to some embodiments, the second corner is diagonal from the third corner in the active view. In some embodiments, the first corner, the second corner, and the third corner are in a predetermined sequence. In certain embodiments, the first corner may be an upper left corner, the second corner being the upper right, the third corner being the bottom left, and the fourth corner being the bottom right. In some instances, the representation of the received data includes at least two small views at two corners overlaid the active view of the second set of data. In some instances, the representation of the received data includes at least three small views at three corresponding corners overlaid the active view of the first set of data.

Figure 2:
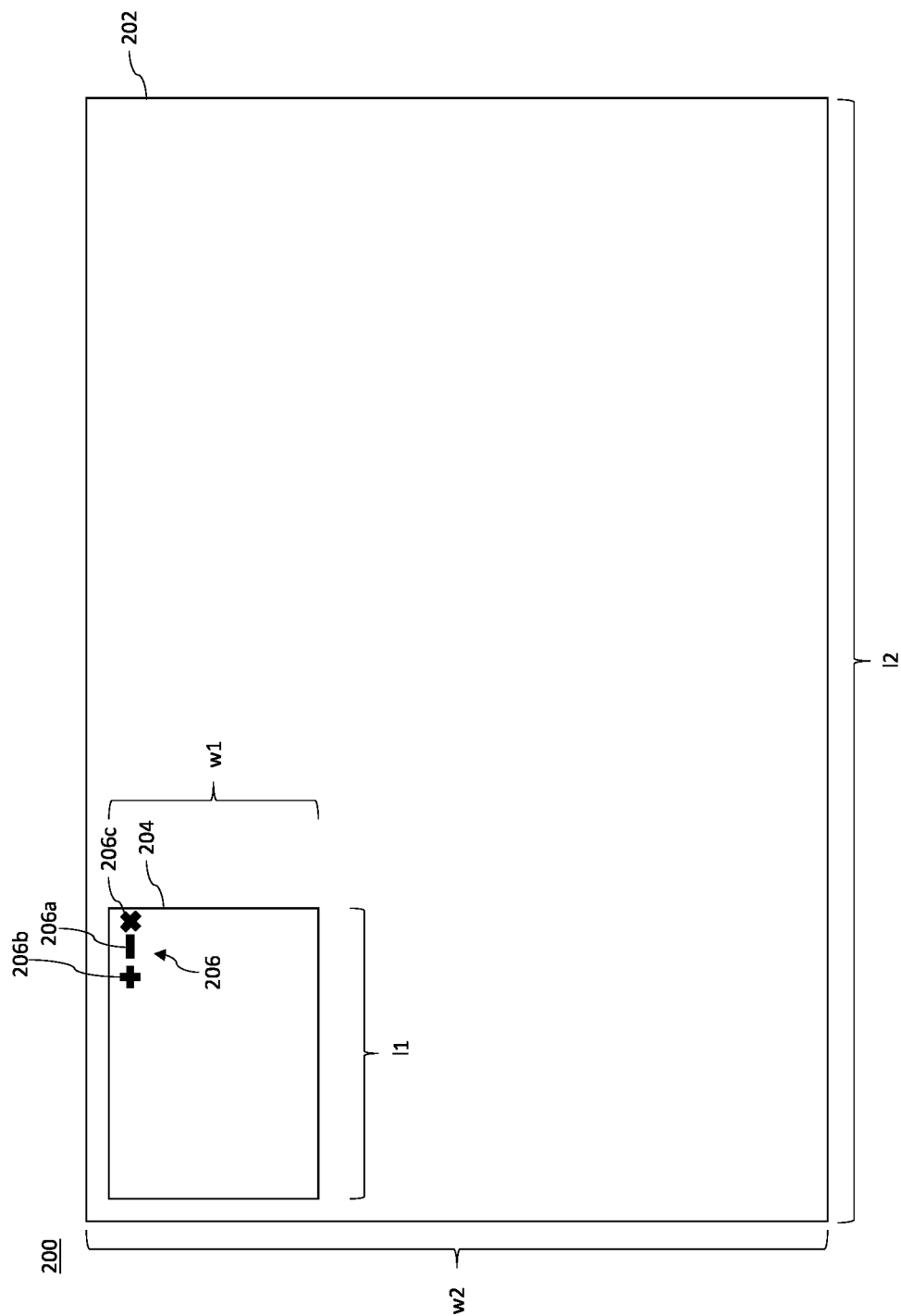
FIG. 2 depicts an illustrative data diagram having a representation of multiple views of data, in accordance with certain embodiments of the present disclosure.

FIG. 2 depicts an illustrative data diagram 200 having a representation of multiple views of data, in accordance with certain embodiments of the present disclosure. FIG. 2 is merely an example. One of ordinary skills in the art would recognize many variations, alternatives, and modifications. The data diagram 200 may be rendered by one or more processors. As an example, the data diagram 200 includes a representation of data received and has a plurality of tiers of views including an active view 202 and a small view 204. The active view 202 may be generated, by one or more processors, based on a first set of data received from a first data source, and the small view 204 based on a second set of data received from a second data source.

In some embodiments, for example as shown, the small view 204 is smaller than the active view 202 in size. In some instances, the width (w1) of the small view 204 is smaller than half of the width (w2) of the active view 202. In some instances, the length (l1) of the small view 204 is smaller than half of the length (l2) of the active view 202. In certain instances, w1 may be from about ¼ to about ⅓ of w2. In certain instances, l1 may be from about ¼ to about ⅓ of l2. In some embodiments, the size of the small view 204 may be from about one-sixteenth to about one-sixth of the size of the active view 202. In certain embodiments, the size of the small view 204 may be from about one-fifteenth to about one-seventh, or from about one-fourteenth to about one-eighth, or from about one-thirteenth to about one-ninth, or from about one-twelfth to about one-tenth of the size of the active view 202. In some instances, the size of the small view in the plurality of tiers of views is in the range of one sixteenth of the active view and one eighth of the size of the active view.

In certain embodiments, each tier of views of the plurality of tiers of views includes a minimized view control to generate a corresponding minimized view. As shown, the small view 204 includes one or more view controls 206. The one or more view controls 206 may include a view control 206a to minimize the small view 204 to a minimized view upon user input. In some embodiments, the view control 206 may include other controls than the minimized view control as shown. For example, the view control 206 may include a view control 206b for enlarging the small view 204 to an active view upon user input, or a view control 206c for closing the view entirely.

In some instances, the user input may be a click or a double click. In some instances, the user input may be a single click. In certain instances, the user input may be a preset hot key (e.g., F8, "Ctrl"+"-", etc.) for minimizing view without interacting with the view control 206.

In some embodiments, the small view 204 of the first set of data includes at least a part of content in an active view of the first set of data. In certain embodiments, the small view 204 of the first set of data includes content in an active view of the first set of data in a first resolution lower than a second resolution of the active view of the first set of data.

Figure 3:
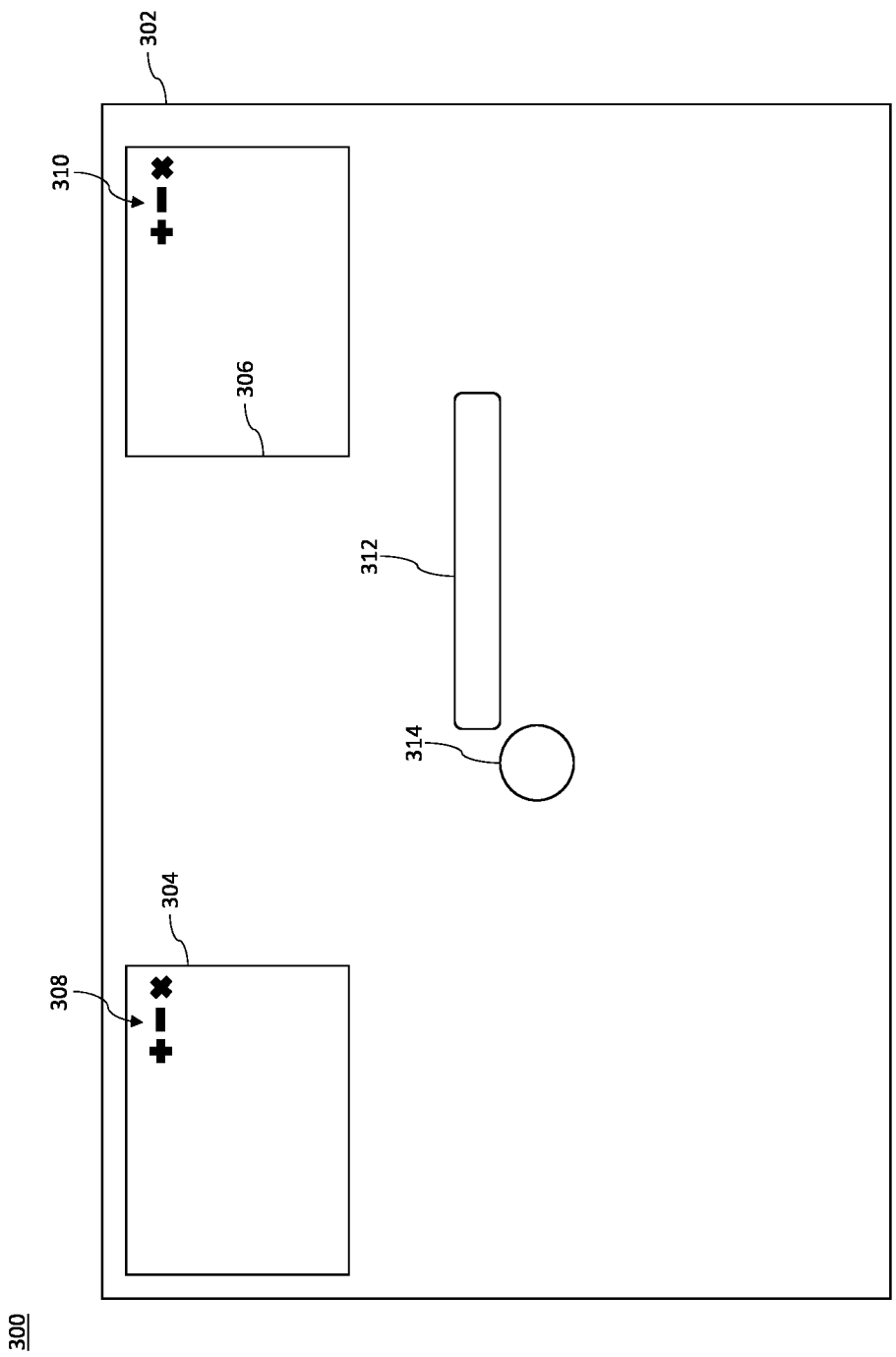
FIG. 3 depicts an illustrative data diagram having a representation of multiple views of data, in accordance with certain embodiments of the present disclosure.

FIG. 3 depicts an illustrative data diagram having a representation of multiple views of data, in accordance with certain embodiments of the present disclosure. FIG. 3 is merely an example. One of ordinary skills in the art would recognize many variations, alternatives, and modifications. The data diagram 300 may be rendered in response to receiving a user input.

In some embodiments, as illustrated, the data diagram 300 includes an active view 302 and two small views 304 and 306. The small view 304 may be based on the first set of data, and the small view 306 based on the second set of data. In some instances, the active view 302 is generated, by one or more processors, based on a third set of data received from a third data source. In yet some instances, the active view 302 is generated based on a graphic representation of the first and second set of data. The first set of data may be correlated to the second set of data or a subset of the second set of data.

In certain embodiments, the small view 304 of the second set of data is overlaid at a first corner on the active view 302 of the third set of data. In some embodiments, the first corner is different from the second corner. In some instances, for example as shown, the small view 306 of the first set of data is overlaid at a second corner on the active view 302 of the third set of data. In certain instances, the first corner is the top left corner whereas the second corner is the top right corner. The small views 304 and 306 may each include one or more view controls 308 and 310, respectively. In some embodiments, a view control (308 and 310) includes a set of controls, for example, a control to change a small view to a respective minimized views, a control to change a small view to a respective active view, and/or a control to close a view.

In some embodiments, in response to receiving a second user input, a tooltip 312 is rendered in the active view 302 of the third set of data. In some instances, the tooltip 312 provides additional information regarding a certain data point within the third set of data, for example, data element 314.

Figure 4:
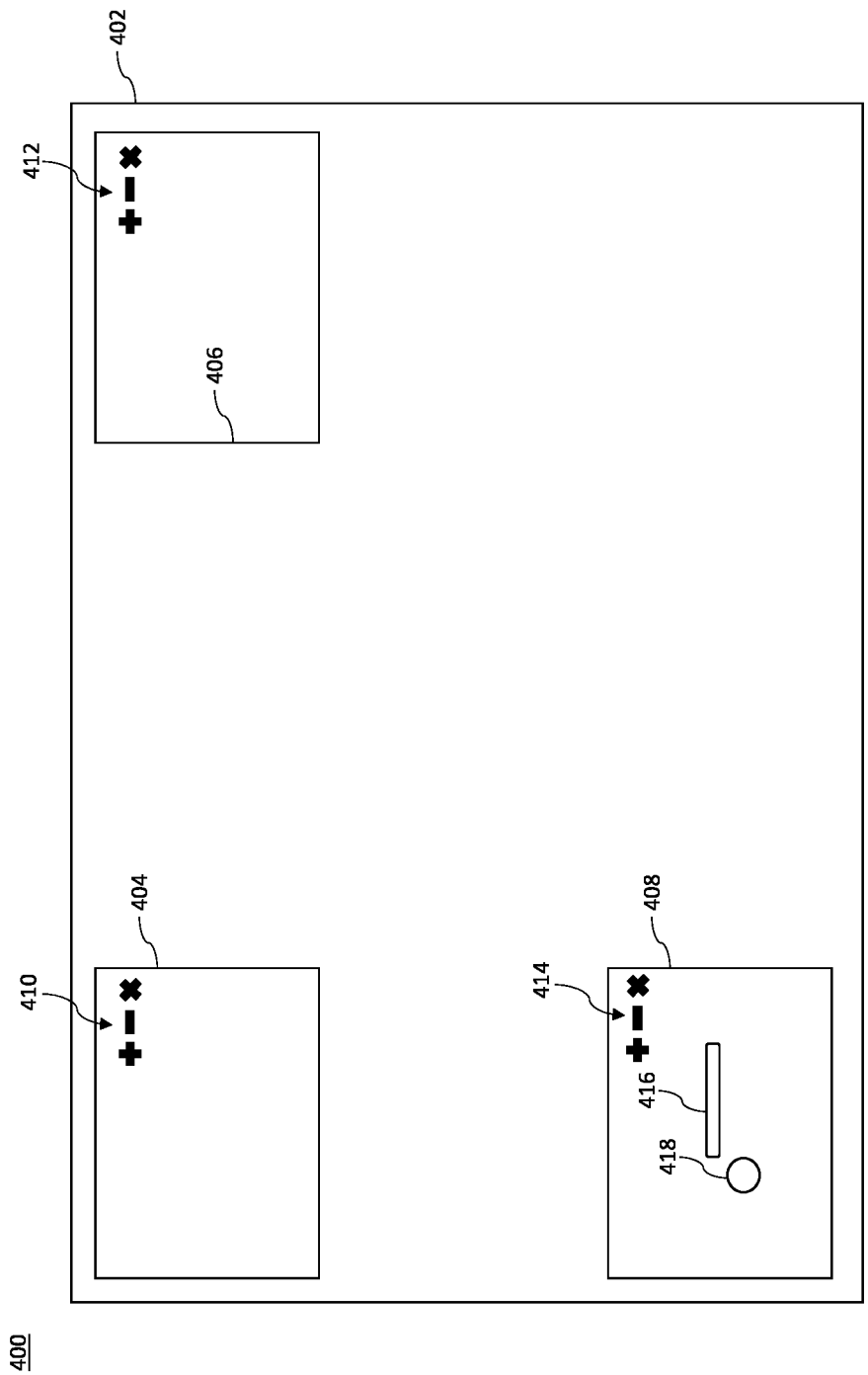
FIG. 4 depicts an illustrative data diagram having a representation of multiple views of data, in accordance with certain embodiments of the present disclosure.

FIG. 4 depicts an illustrative data diagram having a representation of multiple views of data, in accordance with certain embodiments of the present disclosure. FIG. 4 is merely an example. One of ordinary skills in the art would recognize many variations, alternatives, and modifications. The data diagram 400 may be rendered in response to receiving a user input and/or a software input.

In some embodiments, the representation of the received data and user input includes at least two small views at two corners overlaid the active view of the second set of data. In some embodiments, the representation of the received data and user input includes at least three small views at three corresponding corners overlaid the active view of the first set of data. As shown, for example, the data diagram 400 includes an active view 402 and three small views 404, 406, and 408. The small view 404 may be based on the first set of data, and the small view 406 based on the second set of data. In some instances, the active view 402 may be generated, by one or more processors, based on a fourth set of data received from a fourth data source in response to receiving a third user input. In yet some instances, when one of the three small views is a graphic representation generated from the first and second set of data, the active view 402 is generated based on a third set of data received from a third data source.

In certain embodiments, the small view 404 of the first set of data is overlaid at a first corner on the active view 402 of the fourth set of data, the small view 406 of the second set of data is overlaid at a second corner of the active view 402 of the fourth set of data, and the small view 408 of the third set of data is overlaid at a third corner of the active view 402 of the fourth set of data. In some embodiments, the first corner, the second corner, and the third corner are predetermined. In some instances, for example as shown, the first corner is the top left corner of the active view, the second corner is the top right corner of the active view, and the third corner is the bottom left corner of the active view. The small views 404, 406, and 408 may each include a view control 410, 412, and 414, respectively. In some embodiments, a view control (410, 412, and 414) includes a set of controls, for example, a control to change a small view to a respective minimized views, a control to change a small view to a respective active view, and/or a control to close a view.

In some instances, the small view 408 of the third set of data is generated with a resized tooltip 416 corresponding to a tooltip shown in an active view (e.g., the active view 302 of the third set of data in FIG. 3) in response to receiving a third user input. The tooltip 416 provides additional information regarding a certain data point within the third set of data, represented as resized element 418 corresponding to an element shown in an active view (e.g., the active view 302 of the third set of data in FIG. 3).

Figure 5:
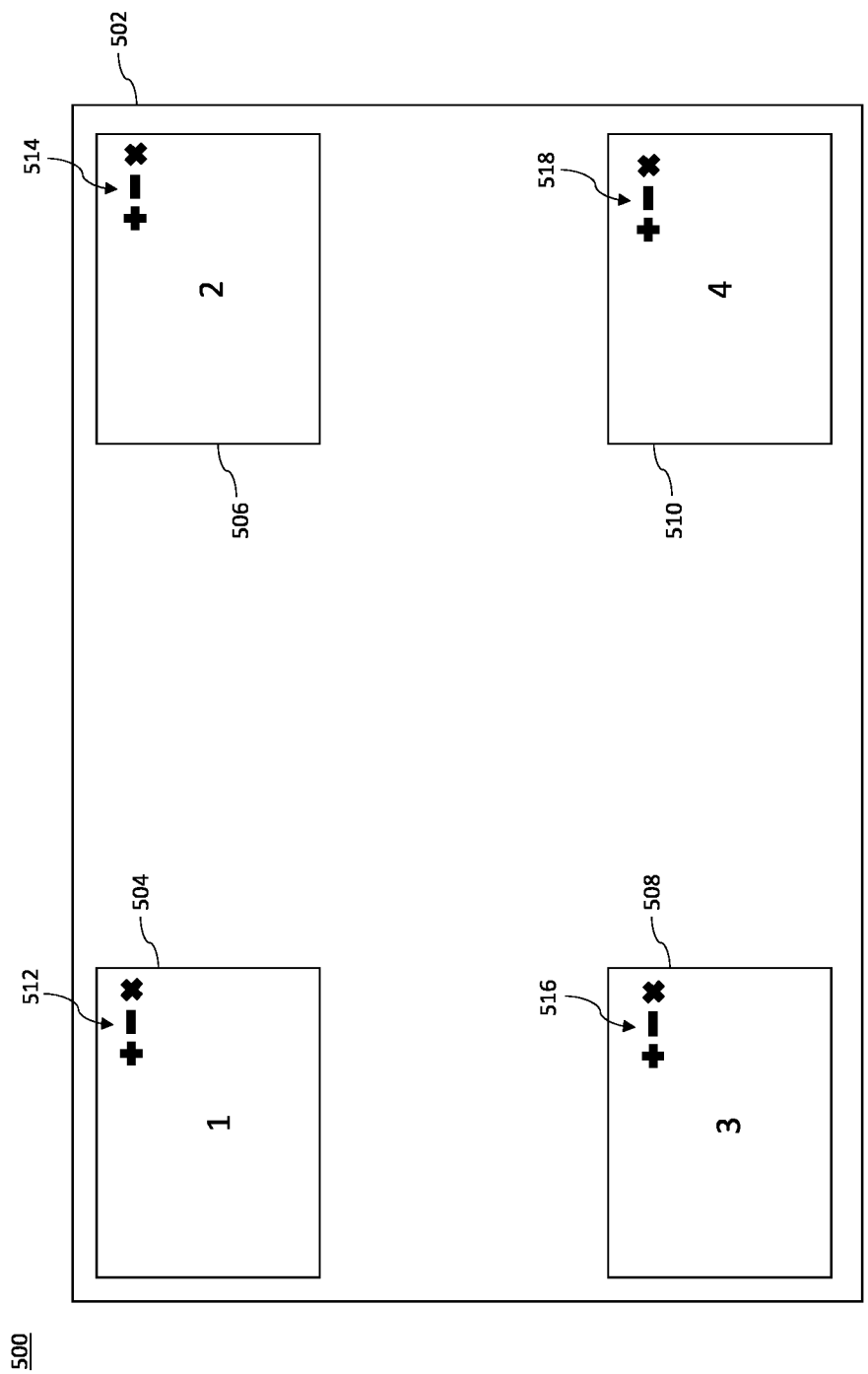
FIG. 5 depicts an illustrative data diagram having a representation of multiple views of data, in accordance with certain embodiments of the present disclosure.

FIG. 5 depicts an illustrative data diagram having a representation of multiple views of data, in accordance with certain embodiments of the present disclosure. FIG. 5 is merely an example. One of ordinary skills in the art would recognize many variations, alternatives, and modifications. The data diagram 500 may be rendered in response to receiving a user input.

In some embodiments, for example as shown, the data diagram 500 includes an active view 502 and four small views 504, 506, 508 and 510. The small view 504 may be based on the first set of data, and the small view 506 based on the second set of data. In some instances, the active view 502 is generated, by one or more processors, based on a fifth set of data received from a fifth data source, whereas small view 508 and 510 are generated based on a third set of data and a fourth set of data, respectively. In yet some instances, the active view 502 is generated, by one or more processors, based on a fourth set of data, whereas the small view 508 is generated based on a graphic representation of the view and second set of data, and the small view 510 is generated based on a third set of data received from a third data source.

According to certain embodiments, each small view of the four small views 504, 506, 508 and 510 may include a view control 512, 514, 516, and 518. In some embodiments, a view control (512, 514, 516, 518) includes a set of controls, for example, a control to change a small view to a respective minimized views, a control to change a small view to a respective active view, and/or a control to close a view.

In certain embodiments, the small view 504 of the first set of data is overlaid at a first corner on the active view 502 of the fifth set of data, the small view 506 of the second set of data is overlaid at a second corner of the active view 502 of the fifth set of data, the small view 508 of the third set of data is overlaid at a third corner of the active view 502 of the fifth set of data, and the small view 510 of the fourth set of data is overlaid at a fourth corner of the active view 502 of the fifth set of data. In some embodiments, the first corner, the second corner, the third corner, and the fourth corner are in a predetermined sequence. In some instances, for example as shown, the first corner is the top left corner of the active view 502, the second corner is the top right corner of the active view 502, the third corner is the bottom left corner of the active view 502, and the fourth corner is the bottom right corner of the active view 502.

According to some embodiments, one or more corners of a view are used in a predetermined sequence. In certain embodiments, a first corner (e.g., top left corner) is used first. In some embodiments, a second corner (e.g., top right corner) is used if two corners are used, for example, for two small and/or minimized views. In certain embodiments, the view at the first corner is moved to the second corner when the second corner is used. In yet certain embodiments, the small view at the first corner is kept in the same corner when a newly generated small view is disposed at the second corner. In some embodiments, a third corner (e.g., bottom left corner) is used if three corners are used. In certain embodiments, the newly generated small view is disposed at the first corner, the view previously at the first corner is moved to the second corner, and the view previously at the second corner is moved to the third corner. In yet certain embodiments, the newly generated small view is disposed at the third corner, whereas the view previously at the first and second corner are kept in the same corner.

Figure 6:
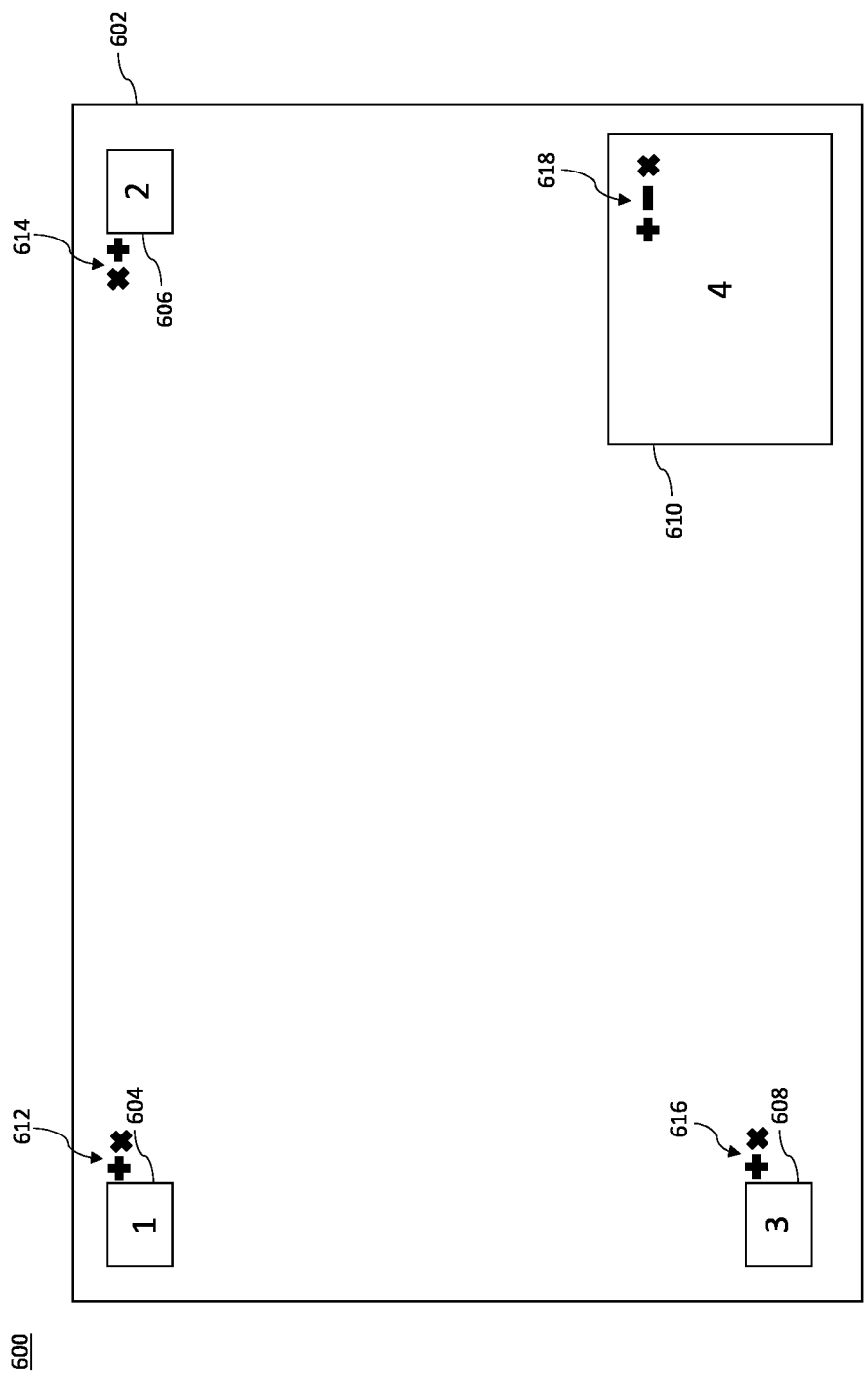
FIG. 6 depicts an illustrative data diagram having a representation of multiple views of data, in accordance with certain embodiments of the present disclosure.

FIG. 6 depicts an illustrative data diagram having a representation of multiple views of data, in accordance with certain embodiments of the present disclosure. FIG. 6 is merely an example. One of ordinary skills in the art would recognize many variations, alternatives, and modifications. The data diagram 600 may be rendered in response to receiving a user input and/or a software input.

In some embodiments, as illustrated, the data diagram 600 includes an active view 602, three minimized views 604, 606, and 608, and a small view 610. The active view 602 may be generated based on a fifth set of data, when the minimized views 604, 606, 608 and small view 610 are based on a first, second, third, and fourth set of data. In some instances, the active view 602 may be generated based on a fourth set of data, when one of the minimized views 604, 606, 608 and small view 610 is generated based on a representation of one or more of a first, second, and third set of data.

According to some embodiments, the sizes of the minimized views 604, 606, and 608 are smaller than small views (e.g., small view 610, or small views 504, 506, 508, and 510 in FIG. 5). In some embodiments, the sizes of the minimized views 604, 606, and 608 are smaller than about one-sixteenths of the size of the active view 602. In some embodiments, the minimized views 604, 606, and 608 do not include content as would be shown in an active view (e.g., active view 602) or a small view (e.g., small view 610).

In certain embodiments, the user input is a click or double click on view controls included in small views (e.g., the view control 618, or view controls 512, 514, 516, and 518 in FIG. 5). In certain embodiments, the user input is a single click on view controls included in small views (e.g., the view control 618, or view controls 512, 514, 516, and 518 in FIG. 5). Each view may be controlled separately by clicking on the view control attached to the view. In some embodiments, the user input may be pressing a hot key preprogramed to minimize all small views displayed at once to minimized views. In yet some embodiments, a user input may be pressing a hot key preprogramed to enlarge all minimized views at once to small views. As shown, each of the minimized views 604, 606, and 608 includes a view control 612, 614, and 616 to enlarge the minimized views to small views upon user input (e.g., double or single click), or to close the views upon user input. In some embodiments, the view controls 612, 614, and 616 may include other controls than the enlarging view control shown. For example, the view controls 612-618 may further include controls for enlarging a minimized view to an active view. In some instances, to enlarge a minimized view to an active view, the user input includes clicking on a corresponding view control of a minimized view to enlarge the minimized view to a small view first, then clicking on the small view itself to subsequently enlarge the small view to an active view.

In some embodiments, the three minimized views 604, 606, and 608 and small view 610 are located at the four corners of the active view in a predetermined sequence. As shown, minimized view 604 is at the top left corner, minimized view 606 at the top right corner, minimized view 608 at the bottom left corner, and small view 610 at the bottom right corner. The predetermined sequence may be based on user input or the timing of the generation of each graphical representation of each set of data. In some embodiments, the predetermined sequence is based on a hierarchy of data (e.g., a third view of data may be based on further analysis of a first and second set of data, instead of an additional set of data). In certain embodiments, the predetermined sequence may be changed by closing certain views in the sequence, or adding more views at the end of the sequence.

Figure 7:
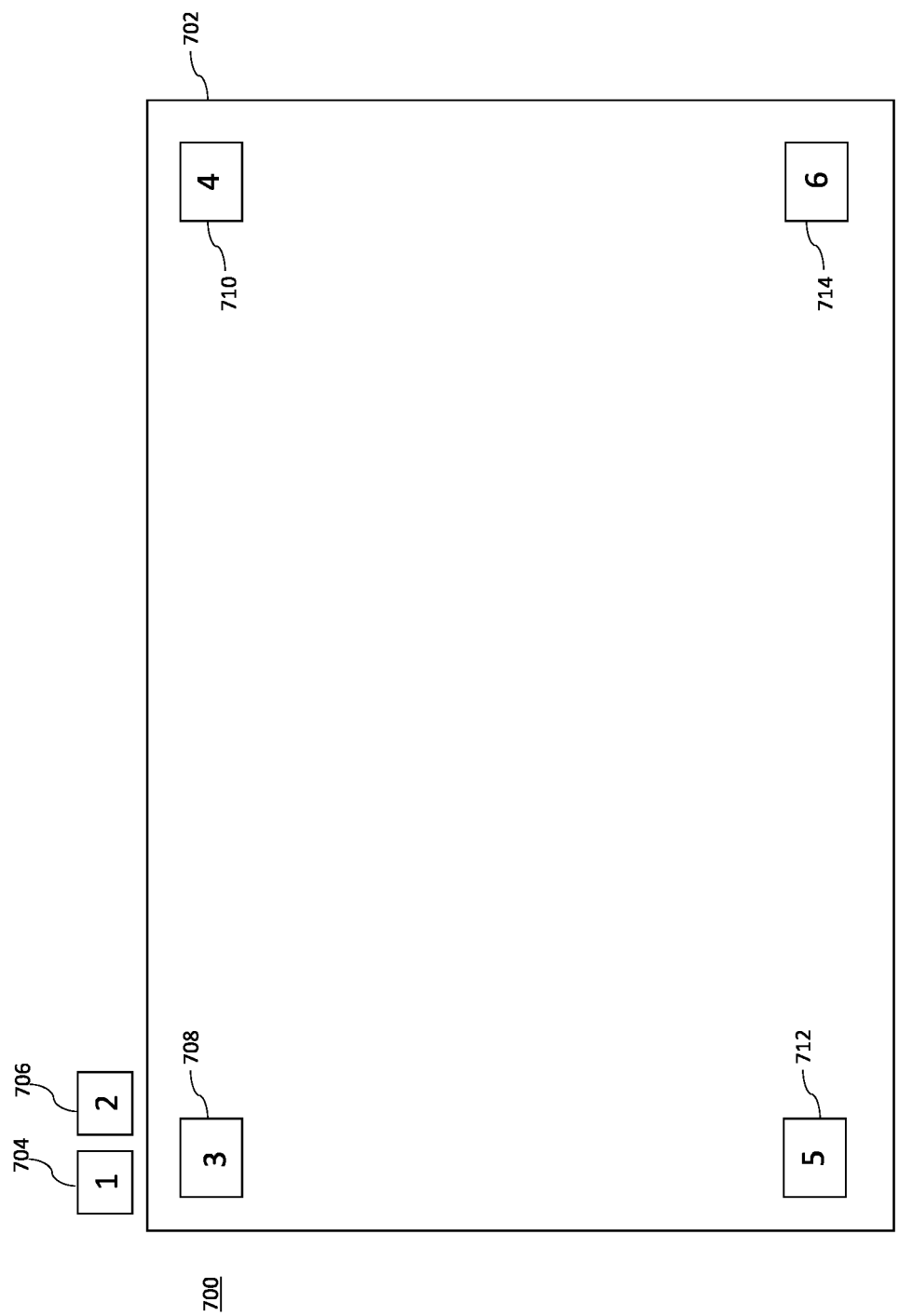
FIG. 7 depicts an illustrative data diagram having a representation of multiple views of data, in accordance with certain embodiments of the present disclosure.

FIG. 7 depicts an illustrative data diagram having a representation of multiple views of data, in accordance with certain embodiments of the present disclosure. FIG. 7 is merely an example. One of ordinary skills in the art would recognize many variations, alternatives, and modifications. The data diagram 700 may be rendered in response to receiving a user input.

In some embodiments, for example as shown, the data diagram 700 includes an active view 702, two tabs 704 and 706, and four minimized views 708, 710, 712, and 714. In some instances, the two tabs 704 and 706 are generated from previous small views and/or minimized views based on a first and second set of data. In some instances, the four minimized views 708-714 are generated based on a third, fourth, fifth, and a sixth set of data, whereas the active view 702 is generated based on a seventh set of data. As shown, the four minimized views 708-714 are located at the four corners of the active view 702.

The user input may be a double or single click to generate the active view 702 based on the seventh set of data. In certain embodiments, the two tabs are located above the top left corner of the active view 702, and the first tab 704, the second tab 706, the first corner, the second corner, the third corner, and the fourth corner are in a predetermined sequence. The size of the tabs 704 and 706 may be smaller or equal to the size of the minimized view 708-714.

Figure 8:
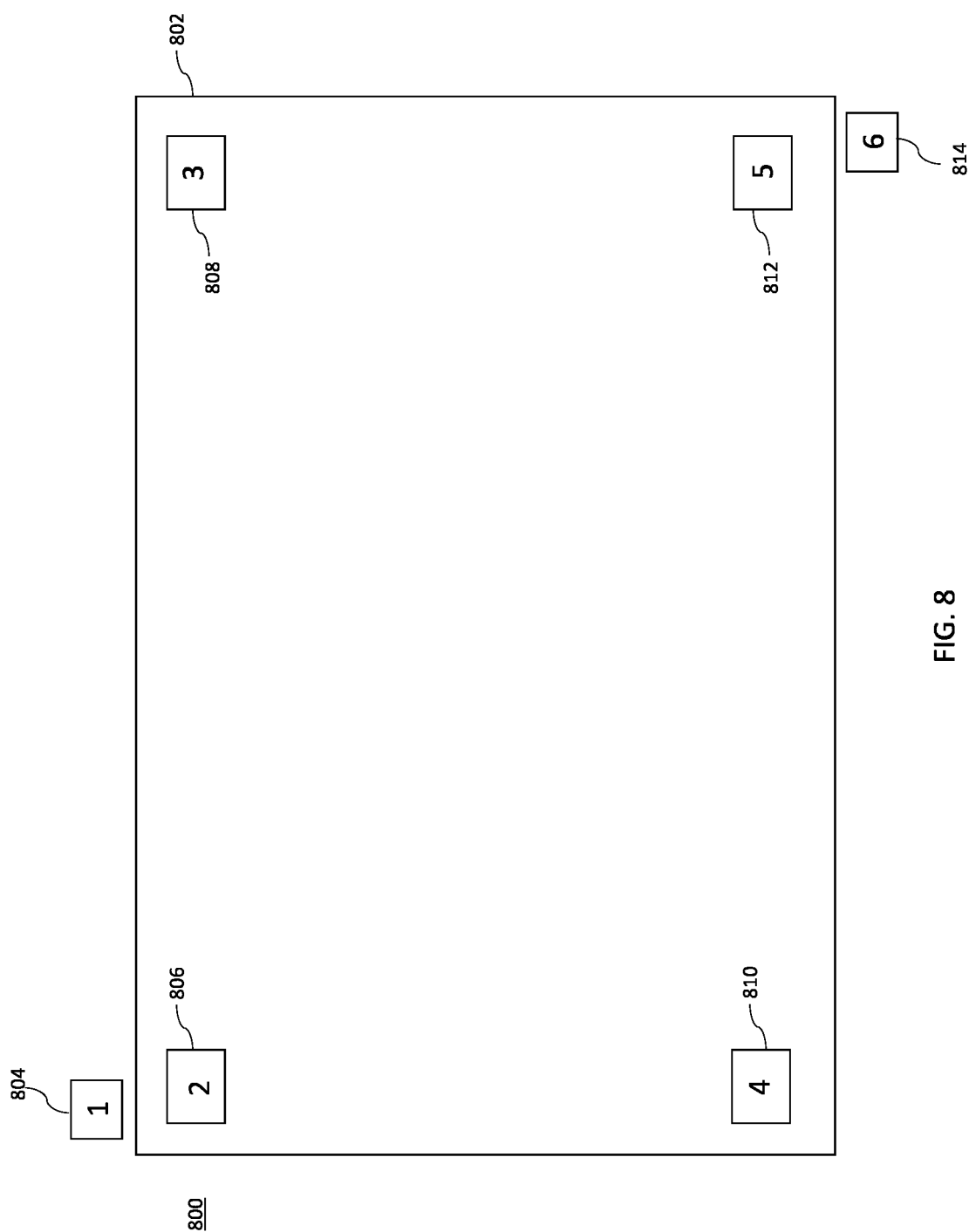
FIG. 8 depicts an illustrative data diagram having a representation of multiple views of data, in accordance with certain embodiments of the present disclosure.

FIG. 8 depicts an illustrative data diagram having a representation of multiple views of data, in accordance with certain embodiments of the present disclosure. One of ordinary skills in the art would recognize many variations, alternatives, and modifications. The data diagram 800 may be rendered in response to receiving a user input.

In some embodiments, for example as shown, the data diagram 800 includes an active view 802, a first tab 804, four minimized views 806-812, and a second tab 814. In some instances, the first tab 804 is generated from a previous small view based on a first set of data. In some instances, the four minimized views 806-812 are generated based on a second, third, fourth, and fifth set of data. In certain instances, the second tab 814 is generated from a previous small view based on a sixth set of data, and the active view 802 is generated based on a seventh set of data. As shown, the four minimized views 806-812 are located at the four corners of the active view 802.

The user input may be a double or single click to move a tab (e.g., the tab 706 in FIG. 7) into a small view. In certain embodiments, the first tab 804 is located above the top left corner of the active view 802, the second tab 814 is located below the bottom right corner of the active view 802, and the four minimized views 806-812 are located at the four corners of the active view 802. In some embodiments, the first tab 804, the minimized view 806 at a first corner, the minimized view 808 at a second corner, the minimized view 810 at a third corner, the minimized view 812 at a fourth corner, and the second tab 814 are in a predetermined sequence.

Figure 9:
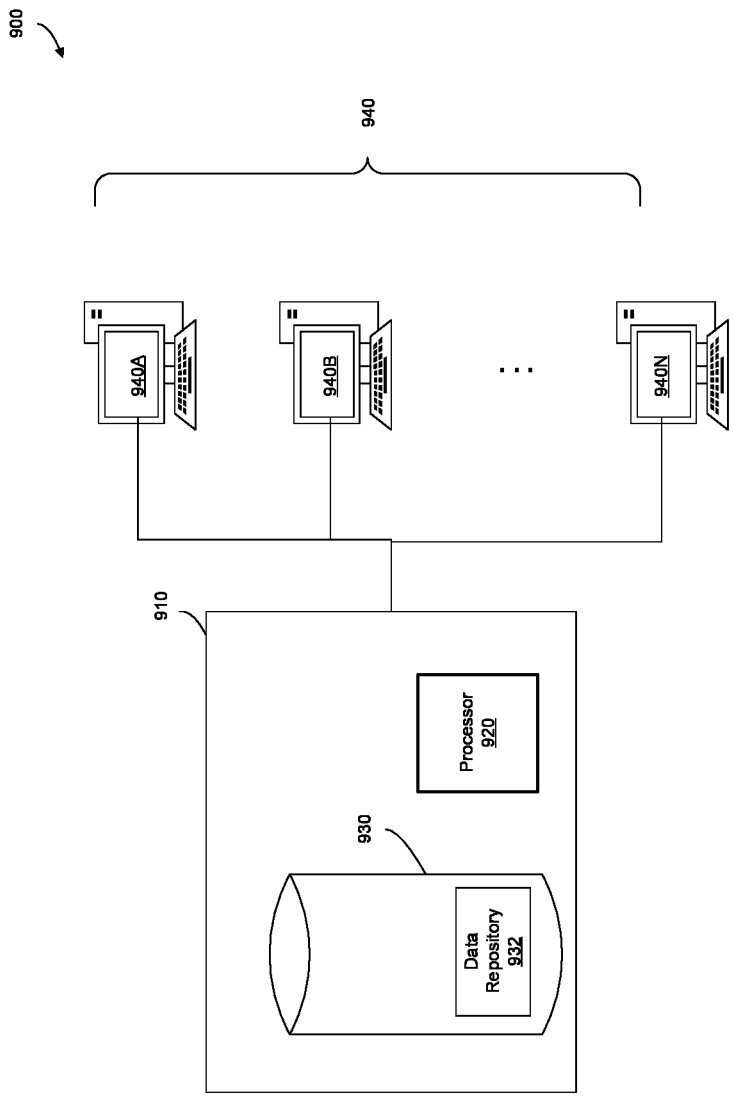
FIG. 9 depicts an illustrative example of a data presentation environment, according to certain embodiments of the present disclosure.

FIG. 9 is an illustrative example of a data presentation environment 900, according to certain embodiments of the present disclosure. FIG. 9 is merely an example. One of ordinary skills in the art would recognize many variations, alternatives, and modifications.

According to certain embodiments, the data presentation environment 900 includes a data presentation system 910 and one or more computing devices and/or data sources 940 (e.g., data source 940A, data source 940B, . . . , data source 940N). According to some embodiments, the data presentation system 910 includes one or more processors 920 for data presentation and one or more memories 930, also referred to as a repository 930. In certain embodiments, the repository 930 includes one or more data repositories 932 for storing data (e.g., sets of data, reports, relationship between objects, classifications, categories, etc.). In some embodiments, the data presentation system 910 is configured to receive one or more data sets from the one or more data sources 940. In certain embodiments, the data presentation system 910 or a portion (e.g., one or more components) of the data presentation system 910 can be integrated with the one or more computing devices and/or data sources

940. For example, the data presentation system 910 can cause representation of data to be presented on a display of a computing device 940.

Although the above has been shown using a selected group of components in the data presentation environment 900, there can be many alternatives, modifications, and variations. For example, some of the components may be expanded and/or combined. Other components may be inserted into those noted above. Depending upon the embodiment, the arrangement of components may be interchanged with others replaced. Further details of these components are found throughout the present disclosure.

According to some embodiments, the data presentation system 910 and/or the one or more processors 920 is configured to receive data from one or more data sources. A data source may be a text data stream, a codified data stream, a numerical data stream, an alphanumerical data stream, a data record, a file, and/or the like. The one or more data sources may include one or more sets of data from each data source. The first set of data may include a first text stream.

According to certain embodiments, the one or more sets of data may be associated with an investigation. In some embodiments, the investigation may be related to law enforcement (e.g., drug transfers, money laundering, wire fraud, identity theft, etc.), although other types of investigation (e.g., employment issues) or other non-investigation are also contemplated. In some embodiments, the one or more sets of data may be associated with organization reports (e.g., reports, industry reports, business analysis, summaries, dashboards, graphs, and charts related to a company and/or its performance). In some embodiments, the one or more sets of data may be associated with comparisons (e.g., comparisons of products, comparisons of products and behaviors, industry trends, consumer/customer behaviors, and market opportunities).

In certain embodiments, the one or more sets of data may be retrieved from one or more data sources 940 including tables of information stored in any suitable manner, storage locations of data, or storage locations within the present system (e.g., a repository or memories 930). Any type of accessible storage architecture is contemplated by the present disclosure.

According to some embodiments, the data presentation system 910 and/or the one or more processors 920 is configured to generate a plurality of tiers of views for the received data, the plurality of tiers of views including a minimized view, an active view, and a small view. In some instances, a first tier may be an active view, a second tier may be a small view, and a third tier may be a minimized view.

In some embodiments, the small view is smaller than the active view in size and larger than the minimized view in size. In certain embodiments, the small view includes a view control to minimize the small view. In some instances, the size of the small view in the plurality of tiers of views is in the range of one sixteenth of the size of the active view and one eighth of the size of the active view. In certain embodiments, the size of the small view is selected to allow a high-level view of content, for example, greater than one-sixteenth of the active view (e.g., a maximized view). In some embodiments, the size of the small view is selected not to block content of the active view. In certain embodiments, the active view is designed with content (e.g., graphics, charts, explanations, tooltips, etc.) disposed in the middle of the active view. In some embodiments, the active view includes at least partially blank content at least one of the four corners of a rectangular view. In certain embodiments, each tier of views of the plurality of tiers of views (e.g., an active view, a small view, a minimized view, etc.) includes a minimized view control to cause the generation of a corresponding minimized view. In some embodiments, a minimized view includes one or more view controls. In certain embodiments, the minimized view does not include content. In some embodiments, the system provides a tooltip when an input (e.g., touch input, mouse input) is at the minimized view.

According to certain embodiments, a tooltip provides information related to an input (e.g., touch input, mouse input, touch position, mouse position, etc.). In some examples, the tooltip includes a title (e.g., the title of a view) and/or a description (e.g., the description of a view or some data). In certain examples, the tooltip includes an enlarged view of certain content. In certain embodiments, the small view and/or the minimized view include a view control to cause the generation of a corresponding active view. In some embodiments, the active view includes a visual representation (e.g., text, explanation, graphical representations, charts, etc.) of data. In certain embodiments, the active view includes a maximized view. In some embodiments, the active view includes a large view.

According to some embodiments, the data presentation system 910 and/or the one or more processors 920 is configured to generate a representation of the received data, the representation including a small view of a first set of data in the received data and an active view of a second set of data in the received data. In some embodiments, the first set of data is correlated to the second set of data. In certain embodiments, the second set of data is a subset of the first set of data.

According to certain embodiments, the data presentation system 910 and/or the one or more processors 920 is configured to receive a user input and/or a software input. The user input may be inputs from a software or system (e.g., inputs via a software interface). In some embodiments, a software interface includes an application programming interface (API), a web service interface, retrieving information from a file, retrieving information from a data repository, and/or the like. In certain embodiments, the user input includes a click or a double-click. According to some embodiments, the data presentation system 910 and/or the one or more processors 920 is configured to generate an active view of the third set of data in the received data in response to receiving the user input. In certain examples, the user input indicates a selection of a subset of data in the active view.

According to some embodiments, the data presentation system 910 and/or the one or more processors 920 is configured to generate a small view of the second set of data in the received data. In some embodiments, the small view of the second set of data includes at least a part of content in the active view of the first set of data, wherein the minimized view of the plurality of tiers of views does not include content. In some embodiments, a minimized view of the first set of data does not include content. In certain embodiments, the small view of the second set of data includes content in the active view of the first set of data in a first resolution lower than a second resolution of the active view of the first set of data.

According to some embodiments, the data presentation system 910 and/or the one or more processors 920 is configured to generate a second representation of the received data including the active view of the third set of data, overlay the small view of the first set of data at a first corner on the active view of the third set of data such that the second representation of the received data includes the small view of the first set of data overlaying the active view of the third set of data, and overlay the small view of the second set of data at a second corner on the active view of the third set of data such that the second representation of the received data includes the small view of the second set of data overlaying the active view of the third set of data.

According to some alternative embodiments, the data presentation system 910 and/or the one or more processors 920 is configured to generate a second representation of the received data by moving the small view of the first set of data from a first corner of the active view on the first set of data to a second corner on the active view of the third set of data, and disposing the small view of the second set of data at the first corner on the active view of the third set of data. In some embodiments, the first corner is different from the second corner.

According to some embodiments, the data presentation system 910 and/or the one or more processors 920 is configured to receive a second user input, and in response to receiving the second user input, render a tooltip in the active view of the third set of data.

According to some embodiments, the data presentation system 910 and/or the one or more processors 920 is configured to receive a third user input associated with a fourth set of data in the received data, and in response to receiving the third user input, generate a small view of the third set of data with a resized tooltip corresponding to the tooltip.

In certain embodiments, the data presentation system 910 and/or the one or more processors 920 is configured to generate a third representation of the received data including an active view of the fourth set of data in the received data, overlay the small view of the third set of data at a third corner on the active view of the fourth set of data such that the third representation of the received data further include the small view of the third set of data overlaying the active view of the fourth set of data, overlay the small view of the second set of data at the second corner on the active view of the fourth set of data, and overlay the small view of the first set of data at the first corner on the active view of the fourth set of data.

According to some alternative embodiments, the data presentation system 910 and/or the one or more processors 920 is configured to generate a third representation of the received data by moving the small view of the first set of data from a second corner on the active view of the third set of data to a third corner on the active view of the fourth set of data, moving the small view of the second set of data from a first corner on the active view of the third set of data to the second corner on the active view on the fourth set of data, and disposing the small view of the third set of data at the first corner on the active view of the fourth set of data.

According to some embodiments, the second corner is diagonal from the third corner in the active view. In some embodiments, the first corner, the second corner, and the third corner are in a predetermined sequence. In certain embodiments, the first corner may be an upper left corner, the second corner being the upper right, the third corner being the bottom left, and the fourth corner being the bottom right. In some instances, the representation of the received data includes at least three small views at three corresponding corners overlaid the active view of the first set of data. In some instances, the representation of the received data includes at least two small views at two corners overlaid the active view of the second set of data.

In some embodiments, the repository 930 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the data presentation environment 900 can execute software or firmware stored in non-transitory computer-readable medium to implement various processing steps. Various components and processors of the environment 900 can be implemented by one or more computing devices including, but not limited to, circuits, a computer, a cloud-based processing unit, a processor, a processing unit, a microprocessor, a mobile computing device, and/or a tablet computer. In some cases, various components of the data presentation environment 900 (e.g., the data presentation system 910, one or more processors 920, one or more data sources 940) can be implemented on a shared computing device. Alternatively, a component of the data presentation environment 900 can be implemented on multiple computing devices. In some implementations, various modules and components of the system 900 can be implemented as software, hardware, firmware, or a combination thereof. In some cases, various components of the data presentation environment 900 can be implemented in software or firmware executed by a computing device.

Various components of the data presentation environment 900 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 10:
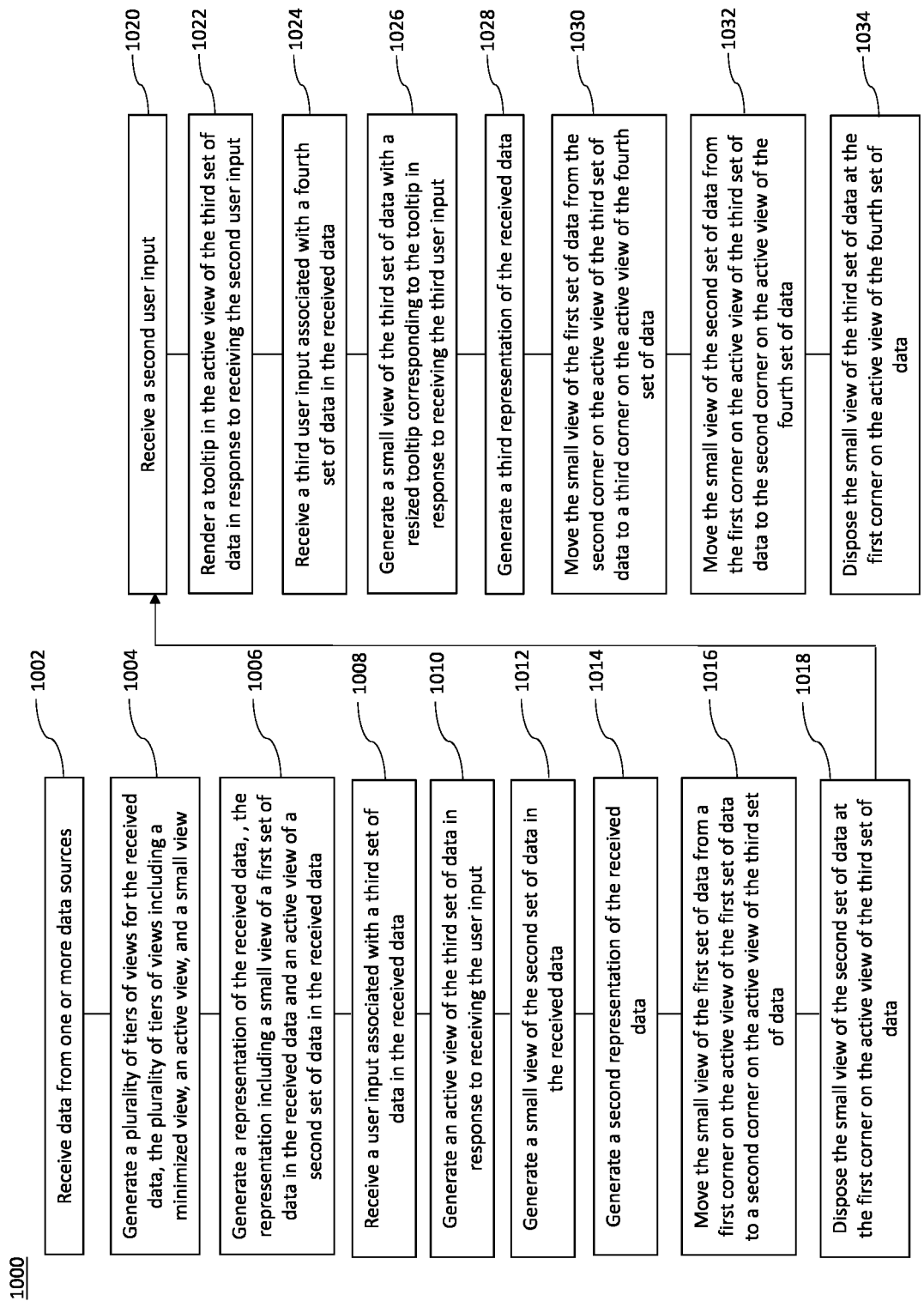
FIG. 10 depicts an illustrative flow diagram showing a method for presenting multiple views of data, in accordance with certain embodiments of the present disclosure.

FIG. 10 depicts an illustrative flow diagram showing a method for presenting multiple views of data, in accordance with certain embodiments of the present disclosure. This diagram is merely an example. One of ordinary skill in the art would recognize many variations, alternatives, and modifications. The method 1000 for presenting multiple views of data includes processes 1002, 1004, 1006, 1008, 1010, 1012, 1014, 1016, 1018, 1020, 1022, 1024, 1026, 1028, 1030,

1032, and 1034. Although the above has been shown using a selected group of processes for the method 1000 for presenting multiple views of data, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 1000 are performed by a system (e.g., the data presentation system 900). In certain examples, some or all processes (e.g., steps) of the method 1000 are performed by a computer and/or a processor directed by a code. For example, a computer includes a server computer and/or a client computer (e.g., a personal computer). In some examples, some or all processes (e.g., steps) of the method 1000 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at process 1002, the system receives data from one or more data sources. A data source may be a text data stream, a codified data stream, a numerical data stream, an alphanumerical data stream, a data record, a file, and/or the like. The one or more data sources may include one or more sets of data from each data source. The first set of data may include a first text stream.

According to certain embodiments, the one or more sets of data may be associated with an investigation. In some embodiments, the investigation may be related to law enforcement (e.g., drug transfers, money laundering, wire fraud, identity theft, etc.), although other types of investigation (e.g., employment issues) or other non-investigation are also contemplated. In some embodiments, the one or more sets of data may be associated with organization reports (e.g., reports, industry reports, business analysis, summaries, dashboards, graphs, and charts related to a company and/or its performance). In some embodiments, the one or more sets of data may be associated with comparisons (e.g., comparisons of products, comparisons of products and behaviors, industry trends, consumer/customer behaviors, and market opportunities).

In certain embodiments, the one or more sets of data may be retrieved from one or more data sources including tables of information stored in any suitable manner, storage locations of data, or storage locations within the present system (e.g., a repository or memories). Any type of accessible storage architecture is contemplated by the present disclosure. Examples of systems and data sources are further discussed below with regard to FIG. 9.

According to some embodiments, at process 1004, the system generates, by one or more processors, a plurality of tiers of views for the received data, the plurality of tiers of views including a minimized view, an active view, and a small view. In some instances, a first tier may be an active view, a second tier may be a small view, and a third tier may be a minimized view.

In some embodiments, the small view is smaller than the active view in size and larger than the minimized view in size. In certain embodiments, the small view includes a view control to minimize the small view. In some instances, the size of the small view in the plurality of tiers of views is in the range of one sixteenth of the size of the active view and one eighth of the size of the active view. In certain embodiments, the size of the small view is selected to allow a high-level view of content, for example, greater than one-sixteenth of the active view (e.g., a maximized view). In some embodiments, the size of the small view is selected not to block content of the active view. In certain embodiments, the active view is designed with content (e.g., graphics, charts, explanations, tooltips, etc.) disposed in the middle of the active view. In some embodiments, the active view includes at least partially blank content at least one of the four corners of a rectangular view. In certain embodiments, each tier of views of the plurality of tiers of views (e.g., an active view, a small view, a minimized view, etc.) includes a minimized view control to cause the generation of a corresponding minimized view. In some embodiments, a minimized view includes one or more view controls. In certain embodiments, the minimized view does not include content. In some embodiments, the system provides a tooltip when an input (e.g., touch input, mouse input) is at the minimized view.

According to certain embodiments, a tooltip provides information related to an input (e.g., touch input, mouse input, touch position, mouse position, etc.). In some examples, the tooltip includes a title (e.g., the title of a view) and/or a description (e.g., the description of a view or some data). In certain examples, the tooltip includes an enlarged view of certain content. In certain embodiments, the small view and/or the minimized view include a view control to cause the generation of a corresponding active view. In some embodiments, the active view includes a visual representation (e.g., text, explanation, graphical representations, charts, etc.) of data. In certain embodiments, the active view includes a maximized view. In some embodiments, the active view includes a large view.

According to some embodiments, at process 1006, the system generates, by the one or more processors, a representation of the received data, the representation including a small view of a first set of data in the received data and an active view of a second set of data in the received data. In some embodiments, the first set of data is correlated to the second set of data. In certain embodiments, the second set of data is a subset of the first set of data.

According to some embodiments, at process 1008, the method 1000 includes receiving a user input and/or a software input. The user input may be inputs from a software or system (e.g., inputs via a software interface). In some embodiments, a software interface includes an application programming interface (API), a web service interface, retrieving information from a file, retrieving information from a data repository, and/or the like. In certain embodiments, the user input includes a click or a double-click. According to some embodiments, at process 1010, the method 1000 includes generating an active view of the third set of data in the received data in response to receiving the user input. In certain examples, the user input indicates a selection of a subset of data in the active view.

According to some embodiments, at process 1012, the system generates a small view of the second set of data in the received data. In some embodiments, the small view of the second set of data includes at least a part of content in the active view of the first set of data, wherein the minimized view of the plurality of tiers of views does not include content. In some embodiments, a minimized view of the first set of data does not include content. In certain embodiments, the small view of the second set of data includes content in the active view of the first set of data in a first resolution lower than a second resolution of the active view of the first set of data.

According to some embodiments, at process 1014, the system generates a second representation of the received data including the active view of the third set of data. In some embodiments, at process 1016, the system moves the small view of the first set of data from a first corner of the active view on the first set of data to a second corner on the active view of the third set of data. In certain embodiments, at process 1018, the system disposes the small view of the second set of data at the first corner on the active view of the third set of data. The first corner may be different from the second corner.

According to some embodiments, the method 1000 includes receiving a second user input at process 1020. In response to receiving the second user input, at process 1022, the system renders a tooltip in the active view of the third set of data.

According to some embodiments, the method 1000 includes receiving a third user input associated with a fourth set of data in the received data at process 1024. In response to receiving the third user input, the system generates a small view of the third set of data with a resized tooltip corresponding to the tooltip at process 1026, and generates a third representation of the received data including an active view of the fourth set of data in the received data at process 1028. In some embodiments, at process 1030, the system moves the small view of the first set of data from a second corner on the active view of the third set of data to a third corner on the active view of the fourth set of data. In certain embodiments, at process 1032, the system moves the small view of the second set of data from the first corner on the active view of the third set of data to the second corner on the active view on the fourth set of data. In some embodiments, at process 1034, the system disposes the small view of the third set of data at the first corner on the active view of the fourth set of data.

According to some embodiments, the second corner is diagonal from the third corner in the active view. In some embodiments, the first corner, the second corner, and the third corner are in a predetermined sequence. In certain embodiments, the first corner may be an upper left corner, the second corner being the upper right, the third corner being the bottom left, and the fourth corner being the bottom right. In some instances, the representation of the received data includes at least three small views at three corresponding corners overlaid the active view of the first set of data. In some instances, the representation of the received data includes at least two small views at two corners overlaid the active view of the second set of data.

According to certain embodiments ("Embodiment 1"), a method for presenting data includes: receiving data from one or more data sources; generating a plurality of tiers of views for the received data, the plurality of tiers of views including a minimized view, an active view, and a small view, the small view being smaller than the active view in size and larger than the minimized view in size, the small view including a view control to minimize the small view; and generating a representation of the received data, the representation including a small view of a first set of data in the received data and an active view of a second set of data in the received data, wherein the method is performed using one or more processors. For example, the method is implemented according to at least FIGS. 1, 9, and/or FIG. 10.

Embodiment 2 is the method of Embodiment 1, wherein the method further includes receiving a user input associated with a third set of data in the received data; and in response to receiving the user input, generating an active view of the third set of data in the received data; generating a small view of the second set of data in the received data; and generating a second representation of the received data including the active view of the third set of data, and the small view of the second set of data overlaying the active view of the third set of data.

Embodiment 3 is the method of Embodiment 2, wherein the small view of the first set of data is moved from a first corner on the active view of the first set of data to a second corner on the active view of the third set of data, the small view of the second set of data is disposed at the first corner on the active view of the third set of data, and the first corner is different from the second corner.

Embodiment 4 is the method of Embodiment 2, wherein the small view of the first set of data is disposed at a first corner on the active view of the third set of data, the small view of the second set of data is disposed at a second corner on the active view of the third set of data, and the first corner is different from the second corner.

Embodiment 5 is the method of Embodiment 2, wherein the method further includes receiving a second user input; and in response to receiving the second user input, rendering a tooltip in the active view of the third set of data.

Embodiment 6 is the method of Embodiment 5, wherein the method further includes receiving a third user input associated with a fourth set of data in the received data; and in response to receiving the third user input, generating a small view of the third set of data with a resized tooltip corresponding to the tooltip; and generating a third presentation of the received data including an active view of the fourth set of data in the received data and the small view of the third set of data overlaying the active view of the fourth set of data.

Embodiment 7 is the method of Embodiment 6, wherein the small view of the first set of data is moved from a second corner on the active view of the third set of data to a third corner on the active view of the fourth set of data; the small view of the second set of data is moved from a first corner on the active view of the third set of data to the second corner on the active view on the fourth set of data; and the small view of the third set of data is disposed at the first corner on the active view of the fourth set of data; wherein the second corner is diagonal from the third corner on the active view.

Embodiment 8 is the method of Embodiment 6, wherein the small view of the first set of data is disposed at a first corner on the active view of the third set of data; the small view of the second set of data is disposed at a second corner on the active view of the third set of data; the small view of the third set of data is disposed at a third corner on the active view of the third set of data; and the second corner is diagonal from the third corner on the active view.

Embodiment 9 is the method of Embodiment 2, wherein the user input includes a click or a double-click.

Embodiment 10 is the method of Embodiment 2, wherein the small view of the first set of data is in the range of one sixteenth of the active view of the first set of data and one eighth of the active view of the first set of data.

Embodiment 11 is the method of Embodiment 1, wherein the small view of the first set of data includes at least a part of content in the active view of the first set of data, wherein a minimized view of the first set of data does not include content.

Embodiment 12 is the method of Embodiment 11, wherein the small view of the first set of data including the at least a part of content in the active view of the first set of data is in a first resolution lower than a second resolution of the active view of the first set of data.

Embodiment 13 is the method of Embodiment 1, wherein each tier of view of the plurality of tiers of views other than the minimized view includes a minimized view control configured to cause generation of a corresponding minimized view.

Embodiment 14 is the method of Embodiment 1, wherein the representation of the received data includes at least two small views at two corners overlaid the active view of the second set of data.

Embodiment 15 is the method of Embodiment 1, wherein the first set of data is correlated to the second set of data.

Embodiment 16 is the method of Embodiment 15, wherein the first set of data is a subset of the second set of data.

Some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code including program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for presenting data, the method comprising:
receiving data from one or more data sources;
generating, by one or more processors, a plurality of tiers of views for the received data, the plurality of tiers of views including a minimized view, an active view, and a small view, the small view being smaller than the active view in size and larger than the minimized view in size, the small view including a view control to minimize the small view;

generating, by the one or more processors, a representation of the received data, the representation including a small view of a first set of data in the received data and an active view of a second set of data in the received data;

receiving a user input associated with a third set of data in the received data; and in response to receiving the user input,
  generating an active view of the third set of data in the received data;
  generating a small view of the second set of data in the received data; and
  generating a second representation of the received data including the active view of the third set of data, and the small view of the second set of data overlaying the active view of the third set of data.

2. The method of claim 1, wherein the small view of the first set of data is moved from a first corner on the active view of the first set of data to a second corner on the active view of the third set of data;
  wherein the small view of the second set of data is disposed at the first corner on the active view of the third set of data;
  wherein the first corner is different from the second corner.

3. The method of claim 1, wherein the small view of the first set of data is disposed at a first corner on the active view of the third set of data;
  wherein the small view of the second set of data is disposed at a second corner on the active view of the third set of data;
  wherein the first corner is different from the second corner.

4. The method of claim 1, further comprising:
  receiving a second user input; and
  in response to receiving the second user input, rendering a tooltip in the active view of the third set of data.

5. The method of claim 4, further comprising:
  receiving a third user input associated with a fourth set of data in the received data;
  in response to receiving the third user input,
    generating a small view of the third set of data with a resized tooltip corresponding to the tooltip; and
    generating a third presentation of the received data including an active view of the fourth set of data in the received data and the small view of the third set of data overlaying the active view of the fourth set of data.

6. The method of claim 5, wherein:
  the small view of the first set of data is moved from a second corner on the active view of the third set of data to a third corner on the active view of the fourth set of data;
  the small view of the second set of data is moved from a first corner on the active view of the third set of data to the second corner on the active view on the fourth set of data; and
  the small view of the third set of data is disposed at the first corner on the active view of the fourth set of data;
  wherein the second corner is diagonal from the third corner on the active view.

7. The method of claim 5, wherein:
  the small view of the first set of data is disposed at a first corner on the active view of the third set of data;
  the small view of the second set of data is disposed at a second corner on the active view of the third set of data; and the small view of the third set of data is disposed at a third corner on the active view of the third set of data;
  wherein the second corner is diagonal from the third corner on the active view.

8. The method of claim 1, wherein the user input includes a click or a double-click.

9. The method of claim 1, wherein the small view of the first set of data is in the range of one sixteenth of an active view of the first set of data and one eighth of the active view of the first set of data.

10. The method of claim 1, wherein the small view of the first set of data includes at least a part of content in an active view of the first set of data, wherein the minimized view of the first set of data does not include content.

11. The method of claim 10, wherein the small view of the first set of data includes the at least a part of content in the active view of the first set of data in a first resolution lower than a second resolution of the active view of the first set of data.

12. The method of claim 1, wherein each tier of view of the plurality of tiers of views other than the minimized view includes a minimized view control configured to cause generation of a corresponding minimized view.

13. The method of claim 1, wherein the representation of the received data includes at least two small views at two corners overlaid the active view of the second set of data.

14. The method of claim 1, wherein the first set of data is correlated to the second set of data.

15. The method of claim 14, wherein the first set of data is a subset of the second set of data.

16. A system for presenting data, comprising:
  one or more memories having instructions stored thereon; and
  one or more processors configured to execute the instructions and perform operations comprising:
    receiving data from one or more data sources;
    generating a plurality of tiers of views for the received data, the plurality of tiers of views including a minimized view, an active view, and a small view, the small view being smaller than the active view in size and larger than the minimized view in size, the small view including a view control to minimize the small view;
    generating a representation of the received data, the representation including a small view of a first set of data in the received data and an active view of a second set of data in the received data;
    receiving a user input associated with a third set of data in the received data; and
    in response to receiving the user input,
      generating an active view of the third set of data in the received data;
      generating a small view of the second set of data in the received data; and
      generating a second representation of the received data including the active view of the third set of data, and the small view of the second set of data overlaying the active view of the third set of data.

17. The system of claim 16, wherein the small view of the first set of data is moved from a first corner on the active view of the first set of data to a second corner on the active view of the third set of data;

wherein the small view of the second set of data is disposed at the first corner on the active view of the third set of data;

wherein the first corner is different from the second corner.

18. The system of claim 16, wherein the small view of the first set of data is disposed at a first corner on the active view of the third set of data;

wherein the small view of the second set of data is disposed at a second corner on the active view of the third set of data;

wherein the first corner is different from the second corner.

19. The system of claim 16, wherein the operations further comprise:

receiving a second user input;

in response to receiving the second user input, rendering a tooltip in the active view of the third set of data;

receiving a third user input associated with a fourth set of data in the received data;

in response to receiving the third user input,
generating a small view of the third set of data with a resized tooltip corresponding to the tooltip; and
generating a third presentation of the received data including an active view of the fourth set of data in the received data and the small view of the third set of data overlaying the active view of the fourth set of data.

20. The system of claim 19, wherein:

the small view of the first set of data is moved from a second corner on the active view of the third set of data to a third corner on the active view of the fourth set of data;

the small view of the second set of data is moved from a first corner on the active view of the third set of data to the second corner on the active view on the fourth set of data; and the small view of the third set of data is disposed at the first corner on the active view of the fourth set of data;

wherein the second corner is diagonal from the third corner on the active view.

21. The system of claim 19, wherein:

the small view of the first set of data is disposed at a first corner on the active view of the third set of data;

the small view of the second set of data is disposed at a second corner on the active view of the third set of data; and the small view of the third set of data is disposed at a third corner on the active view of the third set of data;

wherein the second corner is diagonal from the third corner on the active view.

22. The system of claim 16, wherein the user input includes a click or a double-click.

23. The system of claim 16, wherein the small view of the first set of data is in the range of one sixteenth of an active view of the first set of data and one eighth of the active view of the first set of data.

24. The system of claim 16, wherein the small view of the first set of data includes at least a part of content in an active view of the first set of data, wherein a minimized view of the first set of data does not include content;

wherein the small view of the first set of data includes the at least a part of content in the active view of the first set of data in a first resolution lower than a second resolution of the active view of the first set of data.

25. The system of claim 16, wherein each tier of view of the plurality of tiers of views other than the minimized view includes a minimized view control configured to cause generation of a corresponding minimized view;

wherein the representation of the received data includes at least two small views at two corners overlaid the active view of the second set of data.

26. The system of claim 16, wherein the first set of data is correlated to the second set of data.

27. One or more non-transitory machine-readable media for presenting data having instructions stored thereon, wherein the instructions, when executed by one or more processors, cause the one or more processors to perform operations comprising:

receiving data from one or more data sources;

generating a plurality of tiers of views for the received data, the plurality of tiers of views including a minimized view, an active view, and a small view, the small view being smaller than the active view in size and larger than the minimized view in size, the small view including a view control to minimize the small view;

generating a representation of the received data, the representation including a small view of a first set of data in the received data and an active view of a second set of data in the received data;

receiving a user input associated with a third set of data in the received data; and in response to receiving the user input,
generating an active view of the third set of data in the received data;
generating a small view of the second set of data in the received data;
generating a second representation of the received data including the active view of the third set of data, and the small view of the second set of data overlaying the active view of the third set of data.

* * * * *